United States Patent
Higuchi et al.

(10) Patent No.: US 11,011,126 B2
(45) Date of Patent: May 18, 2021

(54) DISPLAY DEVICE AND DISPLAY CONTROLLER

(71) Applicant: LAPIS Semiconductor Co., Ltd., Yokohama (JP)

(72) Inventors: Koji Higuchi, Yokohama (JP); Kunihiro Harayama, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 16/452,006

(22) Filed: Jun. 25, 2019

(65) Prior Publication Data

US 2019/0392773 A1    Dec. 26, 2019

(30) Foreign Application Priority Data

Jun. 26, 2018  (JP) .............................. JP2018-120472

(51) Int. Cl.
*G09G 3/36*      (2006.01)
*G02F 1/1362*    (2006.01)
*G09G 3/3258*    (2016.01)

(52) U.S. Cl.
CPC ..... *G09G 3/3659* (2013.01); *G02F 1/136213* (2013.01); *G02F 1/136286* (2013.01); *G09G 3/3258* (2013.01); *G09G 3/3677* (2013.01); *G09G 3/3688* (2013.01); *G09G 3/3696* (2013.01); *G09G 2310/0278* (2013.01)

(58) Field of Classification Search
CPC ...... G09G 3/20; G09G 3/3688; G09G 3/3677; G09G 3/3258; G09G 3/3696; G09G 3/3659; G09G 3/3266; G09G 2310/027; G09G 2320/0233; G09G 2310/0278; G09G 2310/0267; G09G 2320/0223; G02F 1/136213; G02F 1/136286

See application file for complete search history.

(56) References Cited

U.S. PATENT DOCUMENTS

| | | | | |
|---|---|---|---|---|
| 2004/0207434 A1* | 10/2004 | Miura | ................... | H03F 3/3023 327/4 |
| 2007/0152947 A1* | 7/2007 | Tanaka | ................... | G09G 5/001 345/100 |
| 2010/0194731 A1* | 8/2010 | Hiratsuka | ............ | G09G 3/3688 345/211 |

(Continued)

FOREIGN PATENT DOCUMENTS

JP            H0895000 A      4/1996

*Primary Examiner* — Vinh T Lam

(74) *Attorney, Agent, or Firm* — Rabin & Berdo, P.C.

(57) ABSTRACT

A display device includes a display panel, a gate driver that supplies scan signals to a first to nth scan lines, a data driver that supplies gradation voltage signals corresponding to a video data signal to a plurality of data lines, and a display controller that supplies the video data signal to the data driver. The display controller supplies a first to nth pieces of display data to the data driver in units of display data pairs each including a kth piece of display data and an (n+1−k)th piece of display data. The gate driver supplies the scan signals to the plurality of scan lines. Each of the scan signals has different pulse widths depending on distance from the data driver to the respective first to nth scan lines. The data driver supplies the gradation voltage signals to the plurality of data lines on the basis of supply of the display data pairs from the display controller.

8 Claims, 7 Drawing Sheets

(56) References Cited

U.S. PATENT DOCUMENTS

| | | | |
|---|---|---|---|
| 2011/0007068 A1* | 1/2011 | Okutani | G09G 3/296 |
| | | | 345/214 |
| 2011/0018846 A1* | 1/2011 | Hu | G09G 3/3648 |
| | | | 345/204 |
| 2011/0157123 A1* | 6/2011 | Cho | G09G 3/3266 |
| | | | 345/211 |
| 2013/0038590 A1* | 2/2013 | Yamada | G09G 3/3655 |
| | | | 345/211 |
| 2014/0091994 A1* | 4/2014 | Lin | G02F 1/13452 |
| | | | 345/87 |
| 2015/0262529 A1* | 9/2015 | Lee | G09G 3/3233 |
| | | | 345/76 |
| 2016/0321978 A1* | 11/2016 | Chang | G09G 3/3648 |
| 2017/0261828 A1* | 9/2017 | Noma | G02F 1/1368 |
| 2017/0287396 A1* | 10/2017 | Akimoto | G09G 3/3233 |
| 2018/0018928 A1* | 1/2018 | Cheng | G09G 3/2092 |
| 2018/0122304 A1* | 5/2018 | Kim | G09G 3/3266 |
| 2018/0158393 A1* | 6/2018 | Woo | G09G 3/3266 |
| 2018/0182279 A1* | 6/2018 | Sakariya | G09G 3/2081 |
| 2018/0182355 A1* | 6/2018 | Kobayashi | G09G 5/10 |
| 2018/0204520 A1* | 7/2018 | Kobayashi | G09G 3/3648 |
| 2019/0043418 A1* | 2/2019 | Rieutort-Louis | H01L 27/3234 |
| 2020/0035168 A1* | 1/2020 | Ueno | G09G 3/3291 |

* cited by examiner

DISPLAY DEVICE AND DISPLAY CONTROLLER

CROSS-REFERENCE TO RELATED APPLICATION

This application is based upon and claims the benefit of priority from the prior Japanese Patent Application No. 2018-120472 filed on Jun. 26, 2018, the entire contents of which are incorporated herein by reference.

BACKGROUND OF THE INVENTION

1. Field of the Invention

The present invention relates to a display device, a display controller, a gate driver, and a data driver.

2. Description of the Related Art

An active matrix driving method is used as a driving method of a display device such a liquid crystal display device and an organic electroluminescent (EL) display device. An active matrix driving display device includes a display panel including a semiconductor substrate on which pixel units and pixel switches are arranged in a matrix. The pixel switches are controlled on and off by scan signals. When the pixel switches are turned on, gradation voltage signals corresponding to a video data signal are supplied to the pixel units to control the luminance of the respective pixel units, whereby a display is effected. The scan signals are supplied to the scan lines by a gate driver. The gradation voltage signals are supplied by a data driver via data lines.

To resolve disturbances to a display image due to errors in various characteristics such as the capacitances of the scan lines and the capacitances of liquid crystals resulting from manufacturing variations, there has been proposed an active matrix driving liquid crystal display device that includes holding means for holding information indicating timing to turn on and off the pixel switches. This enables the liquid crystal display device to specify the timing after the manufacturing of the device (for example, Japanese Patent Application Laid-Open No. 8-95000).

SUMMARY OF THE INVENTION

As display devices used for TV sets and monitors, there is an increasing demand for high-resolution large-screen display devices such as a 4K panel and an 8K panel. As a display panel increases in screen size and resolution, the selection period of a scan signal (i.e., pulse width of a scan signal) output from a gate driver decreases. Meanwhile, the data lines of the display device for a data driver to drive increase in load capacitance. The driving period per pixel in which the data driver performs driving (i.e., data period in which a gradation voltage signal is supplied to a data line) also decreases with the selection period of the scan signal.

Output signals from an output circuit of the data driver have a signal waveform such that rising edges are hardly rounded at positions closer to the output circuit on the data lines (hereinafter, referred to as a data line near end). As the load capacitance of the data lines increases and the driving period decreases, the output signals get more and more rounded at positions farther from the output circuit on the data lines (hereinafter, referred to as a data line far end), with a drop in the rate of writing to pixel electrodes (i.e., rate at which the pixel electrodes reach a target voltage).

Specifically, at the data line near end, the impedances of the data lines have a small effect and the rising edges of the signal waveforms of the gradation voltage signals are not much rounded. The voltage levels of the supplied gradation voltage signals can thus be written to the pixel electrodes without a change. By contrast, at the data line near end, the rising edges of the signal waves are much rounded due to the effect of the impedances of the data lines. The supplied gradation voltage levels fail to be reached within one data period, and voltage levels below those of the supplied gradation voltage signals are written to the pixel electrodes. This causes luminance differences for the same gradation within the display panel, and there has been a problem of degradation in image quality such as luminance variations.

The present invention has been achieved in view of the foregoing problem, and an object thereof is to provide a display device capable of providing a display with suppressed luminance variations.

A display device comprising: a display panel including a plurality of data lines, a first to nth scan lines wherein n is an even number greater than or equal to 2, and pixel switches and pixel units provided at respective intersections of said plurality of data lines and said first to nth scan lines; a gate driver configured to supply scan signals to said first to nth scan lines thereby to cause said pixel switches to be on in a selection period corresponding to pulse widths of said scan signals; a data driver configured to receive a video data signal as much as one frame including first to nth pieces of display data corresponding to the respective first to nth scan lines, and supply gradation voltage signals corresponding to said video data signal to said plurality of data lines; and a display controller configured to supply said video data signal to said data driver, wherein said display controller supplies said first to nth pieces of display data to said data driver in units of display data pairs each including a kth piece of display data and an (n+1−k)th piece of display data wherein k is an integer of 1 to ($\frac{1}{2}$)n, said gate driver supplies said scan signals to said plurality of scan lines, said scan signals having different pulse widths depending on distance from said data driver to said respective first to nth scan lines, and said data driver supplies said gradation voltage signals to said plurality of data lines on a basis of supply of said display data pairs from said display controller.

A display controller according to the present invention is a display controller to be connected to a display device including a gate driver and a data driver, and control said gate driver and said data driver, wherein said display controller is configured to supply a video data signal as much as one frame including a first to nth pieces of display data, wherein n is an even number greater than or equal to 2, to said data driver in units of display data pairs each including a kth piece of display data and an (n+1−k)th piece of display data wherein k is an integer of 1 to ($\frac{1}{2}$)n.

A gate driver according to the present invention is a gate driver to be connected to a display panel including a plurality of data lines, a first to nth scan lines wherein n is an even number greater than or equal to 2, and pixel switches and pixel units provided at respective intersections of said plurality of data lines and said first to nth scan lines, said gate driver being configured to supply scan signals for controlling said pixel switches on in a selection period on a basis of a pulse width to said first to nth scan lines, wherein the gate driver is configured to supply said scan signals to said plurality of scan lines in units of scan line pairs each including a kth scan line and an (n+1−k)th scan line wherein k is an integer of 1 to ($\frac{1}{2}$)n, said scan signals having different pulse widths depending on distance from said data driver to said respective first to nth scan lines.

A data driver according to the present invention is a data driver to be connected to a display panel including a plurality of data lines, a first to nth scan lines wherein n is an even number greater than or equal to 2, and pixel switches and pixel units provided at respective intersections of said plurality of data lines and said first to nth scan lines, said data driver being configured to supply gradation voltage signals corresponding to a video data signal to said plurality of data lines, wherein said data driver is configured to receive input of the video data signal as much as one frame including a first to nth pieces of display data, and supply the gradation voltage signals corresponding to said first to nth pieces of display data to said plurality of data lines in units of display data pairs each including a kth piece of display data and an (n+1−k)th piece of display data wherein k is an integer of 1 to (½)n.

According to the display device of the present invention, a display can be provided while suppressing luminance variations within the display panel plane.

BRIEF DESCRIPTION OF THE DRAWINGS

The features of the present invention will be described by the following description with reference to the accompanying drawings, wherein.

DETAILED DESCRIPTION OF THE INVENTION

Figure 1:
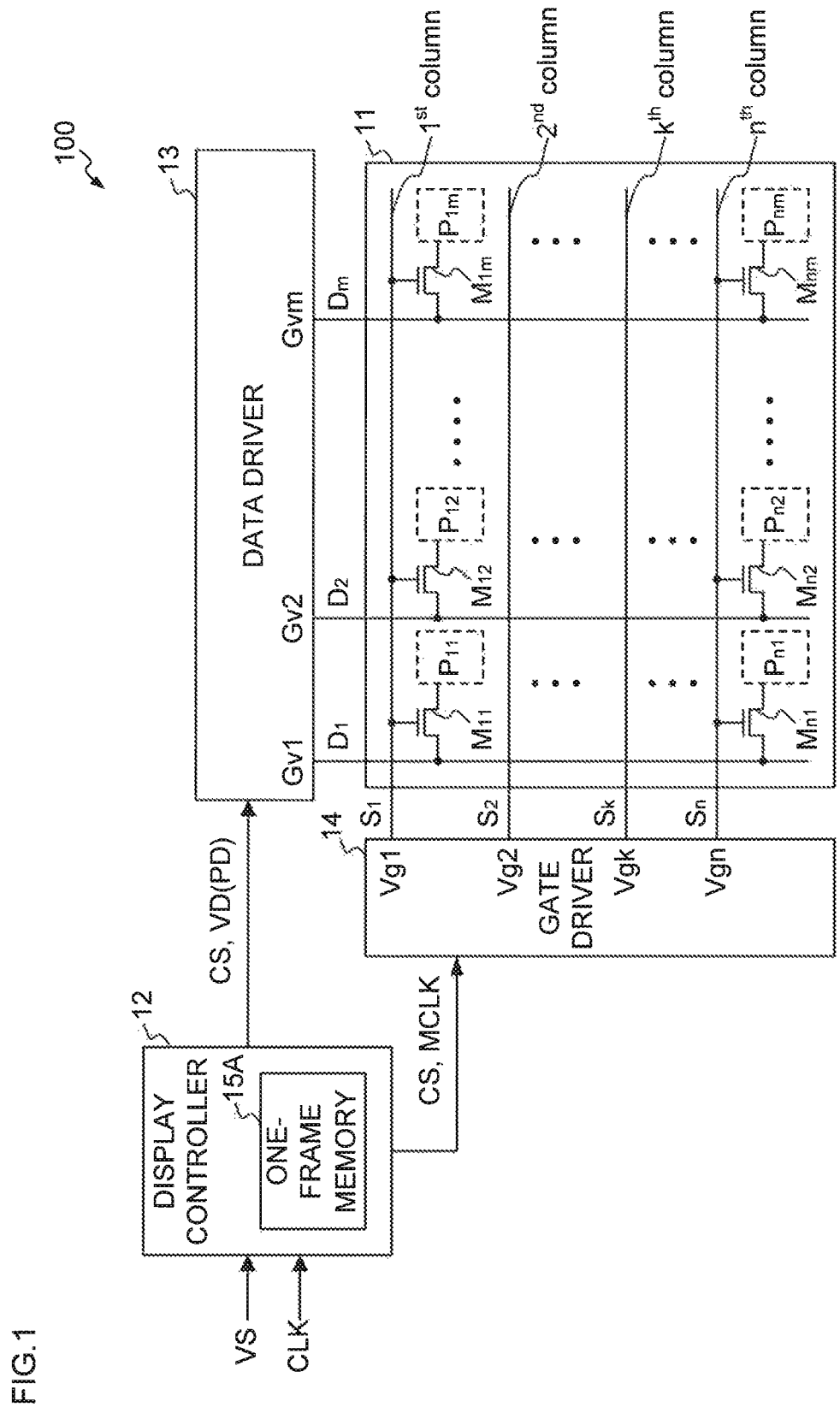
FIG. 1 is a block diagram showing a configuration of a display device according to a first embodiment.

Embodiments of the present invention will be described below with reference to the drawings. In the following description of the embodiments and the accompanying drawings, substantially the same or equivalent parts are designated by the same reference numerals.

First Embodiment

FIG. 1 is a block diagram showing a configuration of a display device 100 according to the present embodiment. The display device 100 is an active matrix driving liquid crystal display device, for example. The display device 100 includes a display panel 11, a display controller (T-con) 12, a data driver 13, and a gate driver 14.

The display panel 11 includes a semiconductor substrate on which a plurality of pixel units $P_{11}$ to $P_{nm}$ and pixel switches $M_{11}$ to $M_{nm}$ (n is an even number greater than or equal to 2, and m is a natural number greater than or equal to 2) are arranged in a matrix. The display panel 11 includes n scan lines $S_1$ to $S_n$ and m data lines $D_1$ to $D_m$ arranged to intersect the scan lines $S_1$ to $S_n$. The pixel units $P_{11}$ to $P_{nm}$ and the pixel switches $M_{11}$ to $M_{nm}$ are provided at the intersections of the scan lines $S_1$ to $S_n$ and the data lines $D_1$ to $D_m$.

The pixel switches $M_{11}$ to $M_{nm}$ are controlled on and off on the basis of scan signals Vg1 to Vgn supplied from the gate driver 14.

The pixel units $P_{11}$ to $P_{nm}$ are supplied with gradation voltage signals Gv1 to Gvm from the data drive 13 when the pixel switches $M_{11}$ to $M_{nm}$ are on. The gradation voltage signals Gv1 to Gvm are signals corresponding to a video data signal VD. The pixel units $P_{11}$ to $P_{nm}$ are controlled in luminance on the basis of the gradation voltage signals Gv1 to Gvm, whereby a display is effected.

If the display device 100 is a liquid crystal display device, the pixel units $P_{11}$ to $P_{nm}$ each include a to not-illustrated transparent electrode and liquid crystals sealed in between the not-shown transparent electrode and a counter substrate. The counter substrate is opposed to the semiconductor substrate and has a single transparent electrode formed on its entire surface. The transmittance of the liquid crystals with respect to a backlight in the display device changes on the basis of potential differences between the gradation voltage signals Gv1 to Gvm supplied to the pixel units $P_{11}$ to $P_{nm}$ and the voltage of the counter substrate, whereby a display is effected.

The display controller 12 includes a one-frame memory 15A which stores an input video signal VS as much as one frame. The display controller 12 extracts first to nth pieces of display data PD indicating the luminance levels of pixels on the respective scan lines $S_1$ to $S_n$ from the input video signal VS for one frame. The display controller 12 generates a video data signal VD including the series of pieces of display data PD, and supplies the video data signal VD to the data driver 13.

The display controller 12 organizes the order of the pieces of display data PD so that one of scan lines closer to the data driver 13 is combined with one of scan lines farther from the data driver 13, and the pieces of display data PD corresponding to the combined scan lines (i.e., the pieces of display data PD to be supplied to the pixel units on the scan lines) come successively. The display controller 12 supplies the resultant to the data driver 13 as the video data signal VD. Specifically, the display controller 12 supplies the display data PD to the data driver 13 in units of display data pairs each including a kth piece of display data corresponding to a scan line $S_k$ and an (n+1−k)th piece of display data corresponding to a scan line $S_{(n+1-k)}$ (k is an integer of 1 to (½)n).

Figure 2:
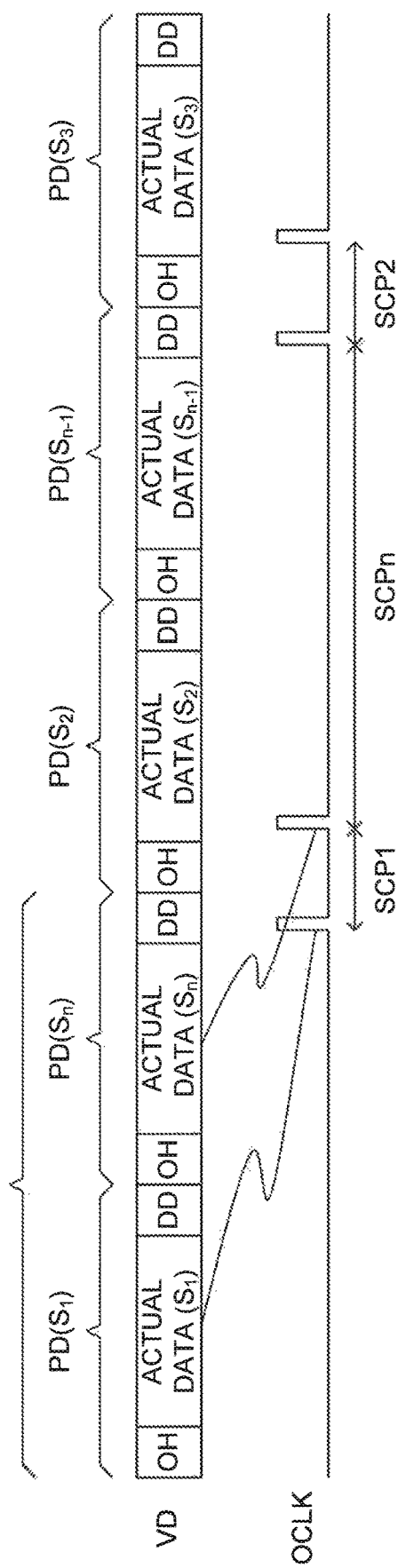
FIG. 2 is a diagram schematically showing a series of pieces of display data that a display controller supplies to a data driver.

FIG. 2 is a diagram showing a configuration of the series of pieces of display data PD (i.e., video data signal VD) that the display controller 12 supplies to the data driver 13. The display data PD includes overhead OH, actual data, and dummy data DD. The overhead OH includes a start pulse and configuration data. The first piece of display data PD corresponding to the scan line $S_1$ and the nth piece of display data PD corresponding to the scan line $S_n$ are combined to constitute display data for two horizontal scan lines. The display controller 12 similarly combines the second piece of display data PD corresponding to the scan line $S_2$ and the (n−1)th piece of display data PD corresponding to the scan line $S_{n-1}$, the third piece of display data PD corresponding to the scan line $S_3$ and the (n−2)th piece of display data PD corresponding to the scan line $S_{n-2}$, . . . . In such a manner, the display controller 12 combines the pieces of display data PD corresponding to the scan lines closer to the data driver 13 and the scan lines farther from the data driver 13 to constitute display data PD corresponding to respective pairs of scan lines as display data for two horizontal scan lines each. As a result, in the video data signal VD, the pieces of display data PD corresponding to the respective scan lines are arranged in order of the scan lines $S_1$, $S_n$, $S_2$, $S_{n-1}$, $S_3$, . . . .

The display controller 12 generates an output clock signal OCLK as a signal indicating the timing at which the respective pieces of display data PD are supplied to the data driver 13. The output clock signal OCLK generated is such that the period between clock pulses (hereinafter, referred to as a clock period) varies depending on the distance from the data driver 13 to the scan lines corresponding to the respective pieces of display data PD (i.e., the scan lines to which the respective pieces of display data PD are supplied). The display controller 12 supplies the display data PD (i.e., video data signal VD) to the data driver 13 on the basis of clock timing of the output clock signal OCLK.

As shown in FIG. 2, a clock period SCP1 indicating the supply timing of the display data PD corresponding to the scan line $S_1$ is shorter than a clock period SCPn indicating the supply timing of the display data PD corresponding to the scan line $S_n$. Since the length of a clock period varies with the distance from the data driver 13 to the scan lines corresponding to the respective pieces of display data PD, there holds SCP1<SCP2<SCP3< . . . <SCPn−1<SCPn. The sum of the clock period SCP1 and the clock period SCPn has the same length as that of the sum of the clock period SCP2 and the clock period SCPn−1 (not shown). In other words, SCP1+SCPn=SCP2+SCPn−1=SCP3+SCPn−2= . . . .

Referring to FIG. 1 again, the display controller 12 supplies a control signal CS to the data driver 13 and the gate driver 14. The display controller 12 is supplied with a clock signal CLK, generates a modulation clock signal MCLK on the basis of the clock signal CLK, and supplies the modulation clock signal MCLK to the gate driver 14. The modulation clock signal MCLK defines the pulse widths of the scan signals from the gate driver 14.

The data driver 13 is supplied with the video data signal VD including the series of pieces of display data PD from the display controller 12, and supplies the gradation voltage signals Gv1 to Gvm on the basis of the display data PD to the pixel units $P_{11}$ to $P_{nm}$ via the data lines $D_1$ to $D_m$. The data driver 13 supplies the gradation voltage signals Gv1 to Gvm having multiple levels on the basis of the number of gradations to the data lines $D_1$ to $D_m$.

Figure 3A:
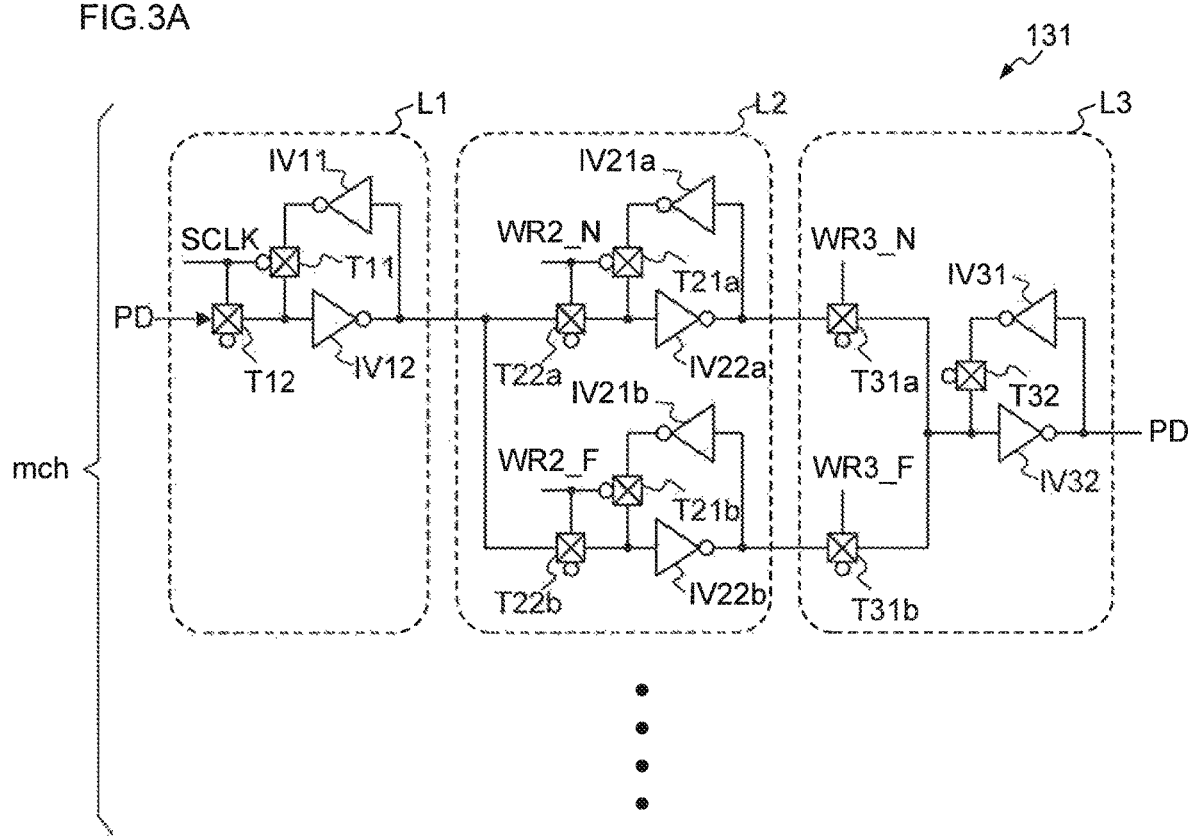
FIG. 3A is a circuit diagram showing a configuration of a latch circuit included in the data driver.

FIG. 3A is a circuit diagram showing a configuration of a latch circuit 131 included in the data driver 13. The latch circuit 131 includes a first latch unit L1, a second latch unit L2, and a third latch unit L3. The data driver 13 includes m channels of similar latch circuits 131.

Figure 3B:
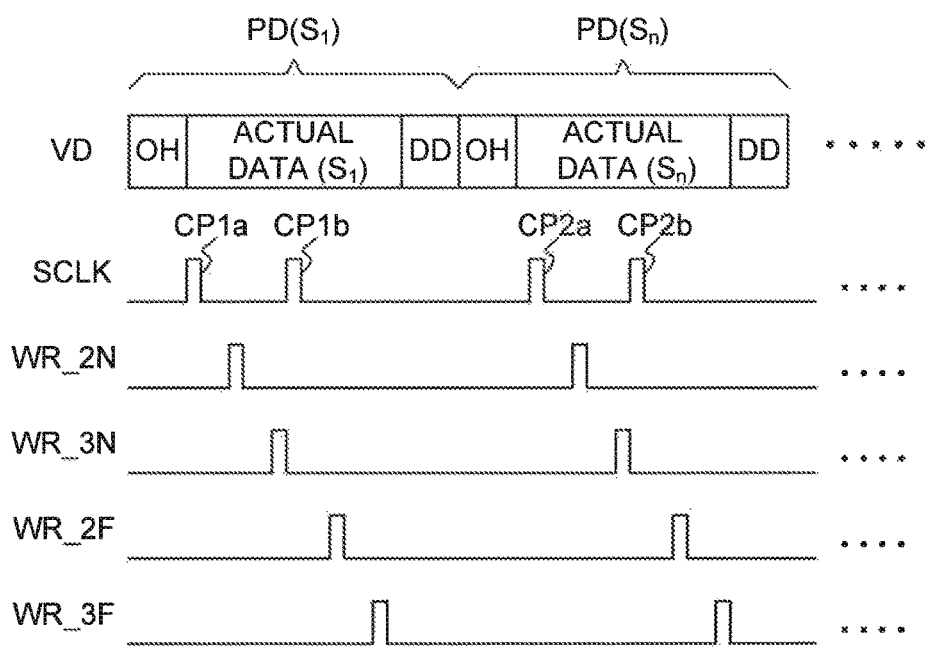
FIG. 3B is a diagram showing a shift clock signal and latch signals.

FIG. 3B shows a shift clock signal SCLK and latch signals WR2_N, WR2_F, WR3_N, and WR3_F for controlling the timing of a latch operation of the latch circuit 131. The shift clock signal SCLK includes clock pulses CP1a, CP2a, . . . indicating the latch timing of display data PD to be supplied to scan lines closer to the data driver 13, and clock pulses CP1b, CP2b, . . . indicating the latch timing of display data PD to be supplied to scan lines farther from the data driver 13.

The latch signal WR2_N is a signal obtained by shifting the clock pulses CP1a, CP2a, . . . of the shift clock signal SCLK. The latch signal WR2_F is a signal obtained by shifting the clock pulses CP1b, CP2b, . . . of the shift clock signal SCLK. The latch signals WR3_N and WR3_F are signals obtained by shifting the latch signals WR2_N and WR2_F, respectively.

Referring to FIG. 3A again, the first latch unit L1 includes inverters IV11 and IV12 and transmission gates T11 and T12. The first latch unit L1 takes in one bit of display data PD on the basis of the shift clock signal SCLK. The first latch unit L1 has a function of sequentially accumulating data.

The second latch unit L2 includes a near end-side latch unit including inverters IV21a and IV22a and transmission gates T21a and T22a, and a far end-side latch unit including inverters IV21b and IV22b and transmission gates T21b and T22b. The near end-side latch unit takes in display data PD corresponding to scan lines on a side closer to the data driver 13 (hereinafter, referred to as a data line near end) on the basis of the latch signal WR2_N. The far end-side latch unit takes in display data PD corresponding to scan lines on a side farther from the data drive 13 (hereinafter, referred to a data line far end) on the basis of the latch signal WR2_F. The second latch unit L2 has a function of settling data.

The third latch unit L3 includes inverters IV31 and IV32 and transmission gates T31a, T31b, and T32. The third latch unit L3 takes in the data corresponding to the scan lines on the data line near end on the basis of the latch signal WR3_N, and takes in the data corresponding to the scan lines on the data line far end on the basis of the latch signal WR3_F. The near end-side data and far end-side data taken in are alternately output to a circuit of the next stage, such as a DC converter. The third latch unit L3 has a function of controlling data output timing.

With such a configuration, the latch circuit 131 included in the data driver 13 can accumulate data transmitted from the display controller 11 in units of display data PD for two horizontal scan lines, and output the data in units of one horizontal scan line.

Referring to FIG. 1 again, the gate driver 14 is supplied with the modulation clock signal MCLK and the control signal CS from the display controller 12, and supplies the scan signals Vg1 to Vgn to the scan lines $S_1$ to $S_n$ on the basis of the modulation clock signal MCLK and the control signal CS. The gate driver 14 supplies the scan signals Vg1 to Vgn having at least two values to the scan lines $S_1$ to $S_n$.

The scan signals Vg1 to Vgn are generated on the basis of the modulation clock signal MCLK so that the scan signals corresponding to the scan lines on the data line near end have shorter pulse widths and the scan signals corresponding to the scan lines on the data line far end have longer pulse widths. More specifically, the pulse widths of the respective scan signals Vg1 to Vgn are such that Vg1<Vg2<Vg3< . . . <Vgn. The pulse widths of the scan signals Vg1 to Vgn define selection periods of the pixel switches $M_{11}$ to $M_{nm}$.

The gate driver 14 supplies the scan signals corresponding to the scan lines on the data line near end and the scan signals corresponding to the scan lines on the data line far end alternately. Specifically, the gate driver 14 supplies the scan signals Vg1 to Vgn corresponding to the respective scan lines in order of the scan lines $S_1$, $S_n$, $S_2$, $S_{n-1}$, $S_3$, $S_{n-2}$, . . . .

A video data signal as much as one screen is rewritten in each frame period, whereby the pixel units $P_{11}$ to $P_{nm}$ are selected in units of pixel rows corresponding to the scan lines $S_1$ to $S_n$, and the gradation voltage signals Gv1 to Gvm are supplied to the pixel units $P_{11}$ to $P_{nm}$ via the data lines $D_1$ to $D_m$. In the following description, the supply of the gradation voltage signals Gv1 to Gvm to the pixel units $P_{11}$ to $P_{nm}$ will also be referred to as "writing of the gradation voltage signals to pixel electrodes".

Figure 4:
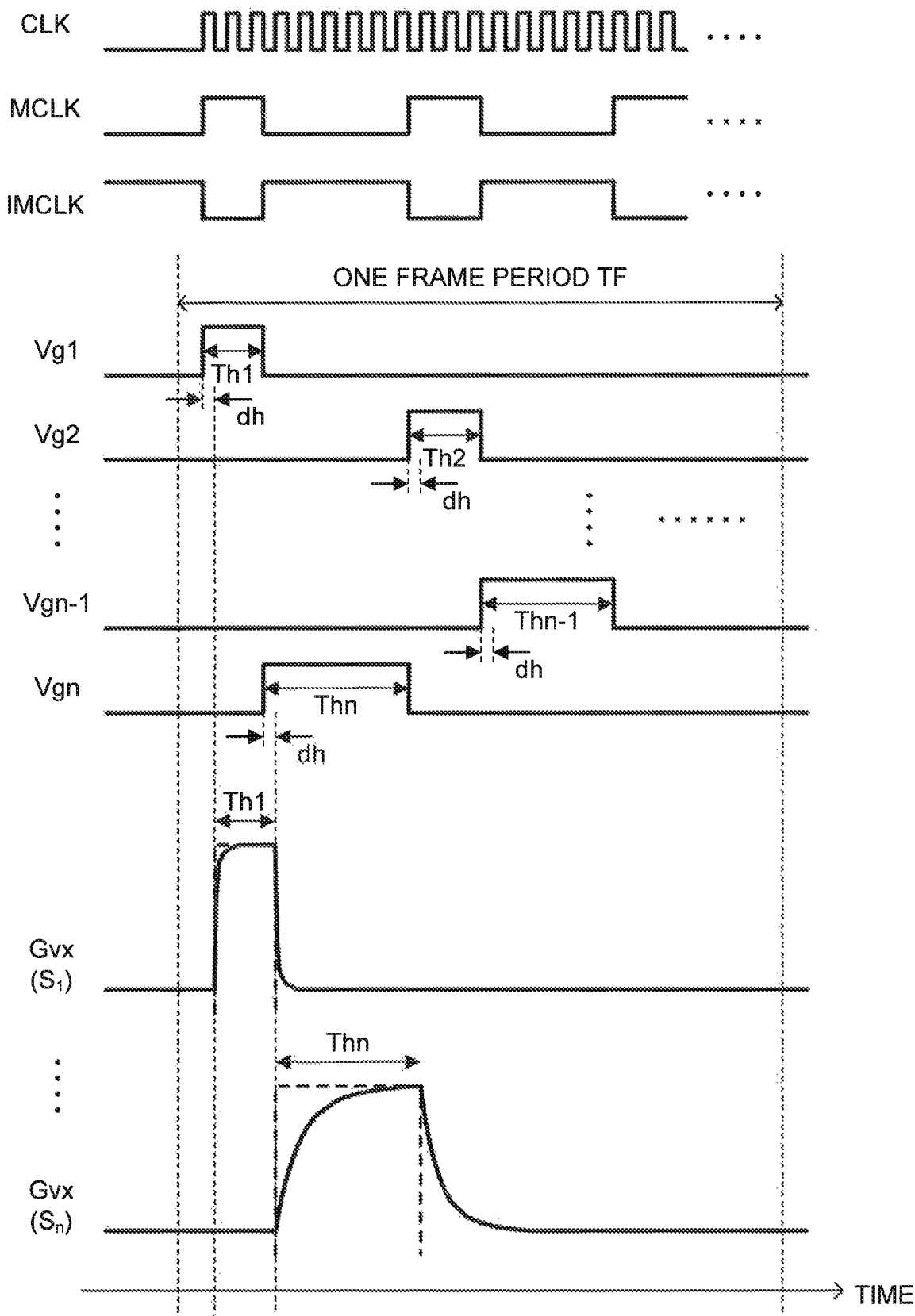
FIG. 4 is a timing chart showing a clock signal, a modulation clock signal, scan signals, and a gradation voltage signal supplied to a data line in one frame period.

FIG. 4 is a timing chart showing the clock signal CLK, the modulation clock signal MCLK, the scan signals Vg1 to Vgn, and a gradation voltage signal Gvx supplied to a data line $D_x$ in one frame period TF of the display device 100 according to the present embodiment.

The display controller 12 generates the modulation clock signal MCLK by counting a predetermined number of clock pulses of the clock signal CLK. The modulation clock signal MCLK has a short pulse width and a long interval between clock pulses immediately after a start of one frame period TF. The modulation clock signal MCLK changes so that the pulse width increases and the interval between clock pulses decreases toward an end of one frame period TF.

An inverted modulation clock signal IMCLK is obtained by inverting the modulation clock signal MCLK. The inverted modulation clock signal IMCLK has a long pulse width and a short interval between clock pulses immediately after the start of one frame period TF. The inverted modulation clock signal IMCLK changes so that the pulse width decreases and the interval between clock pulses increases toward the end of one frame period TF.

The pulse widths of the modulation clock signal MCLK define the pulse widths of the scan signals Vg1, Vg2, Vg3, . . . on the data line near end. The selection periods of the scan signals Vg1 to Vgn and one data period of each of the gradation voltage signals Gv1 to Gvm are thus shorter on the data line near end.

The pulse widths of the inverted modulation clock signal IMCLK define the pulse widths of the scan signals Vgn, Vgn−1, Vgn−2, . . . on the data line far end. The selection periods of the scan signals Vg1 to Vgn and one data period of each of the gradation voltage signals Gv1 to Gvm are thus longer on the data line far end.

The gate driver 14 supplies the scan signals Vg1 to Vgn in order of the first scan line $S_1$, the nth scan line $S_n$, the second scan line $S_2$, the (n−1)th scan line $S_{n-1}$, from the side of the display panel 11 closer to the data driver 13. In one frame period, the pixel switches $M_{11}$ to $M_{nm}$ are thus selected by the scan signals Vg1 to Vgn in an alternate manner, like the scan line $S_1$ on the side near the data driver 13, the scan line $S_n$ on the far side, the scan line $S_2$ on the near side, the scan line $S_{n-1}$ on the far side, . . . . In other words, the pixel switches $M_{11}$ to $M_{nm}$ are sequentially turned on in an alternate manner, like a pixel row (1st_row) on the side near the data driver 13, a pixel row (nth_row) on the far side, a pixel row (2nd_row) on the near side, a pixel row (n−1th_row) on the far side, . . . . The gradation voltage signals Gv1 to Gvm supplied from the data driver 13 to the respective data lines $D_1$ to $D_m$ are sequentially written to the pixel electrodes in units of pixel rows.

Gradation voltage signals Gvx($S_1$) and Gvx($S_n$) shown in FIG. 4 represent the waveforms (solid lines) of the gradation voltage signal Gvx corresponding to the selection periods of the respective scan signals Vg1 to Vgn on the data line $D_x$ among the data lines $D_1$ to $D_m$. The gradation voltage signal Gvx is a voltage signal having multiple levels corresponding to gradation levels. For convenience of description, the gradation voltage signal Gvx here is shown to have a waveform pattern of maximum amplitude so that the voltage level reaches the maximum level within each selection period. The ideal pulse waveforms of the gradation voltage signals are shown by broken lines. A predetermined timing difference dh is provided between the selection periods of the respective scan signals Vg1 to Vgn and the data periods of the corresponding gradation voltage signals Gvx ($S_1$) to Gvx($S_n$).

The gradation voltage signal Gvx is written to the pixel electrodes via the data line $D_x$. The rising edges of the signal waveform of the gradation voltage signal Gvx are rounded due to the effect of the impedance of the data line. The impedance of the data line has a higher effect and the rising edges of the signal waveform of the gradation voltage signal are more rounded on the data line far end in particular, compared to the data line near end.

Figure 5:
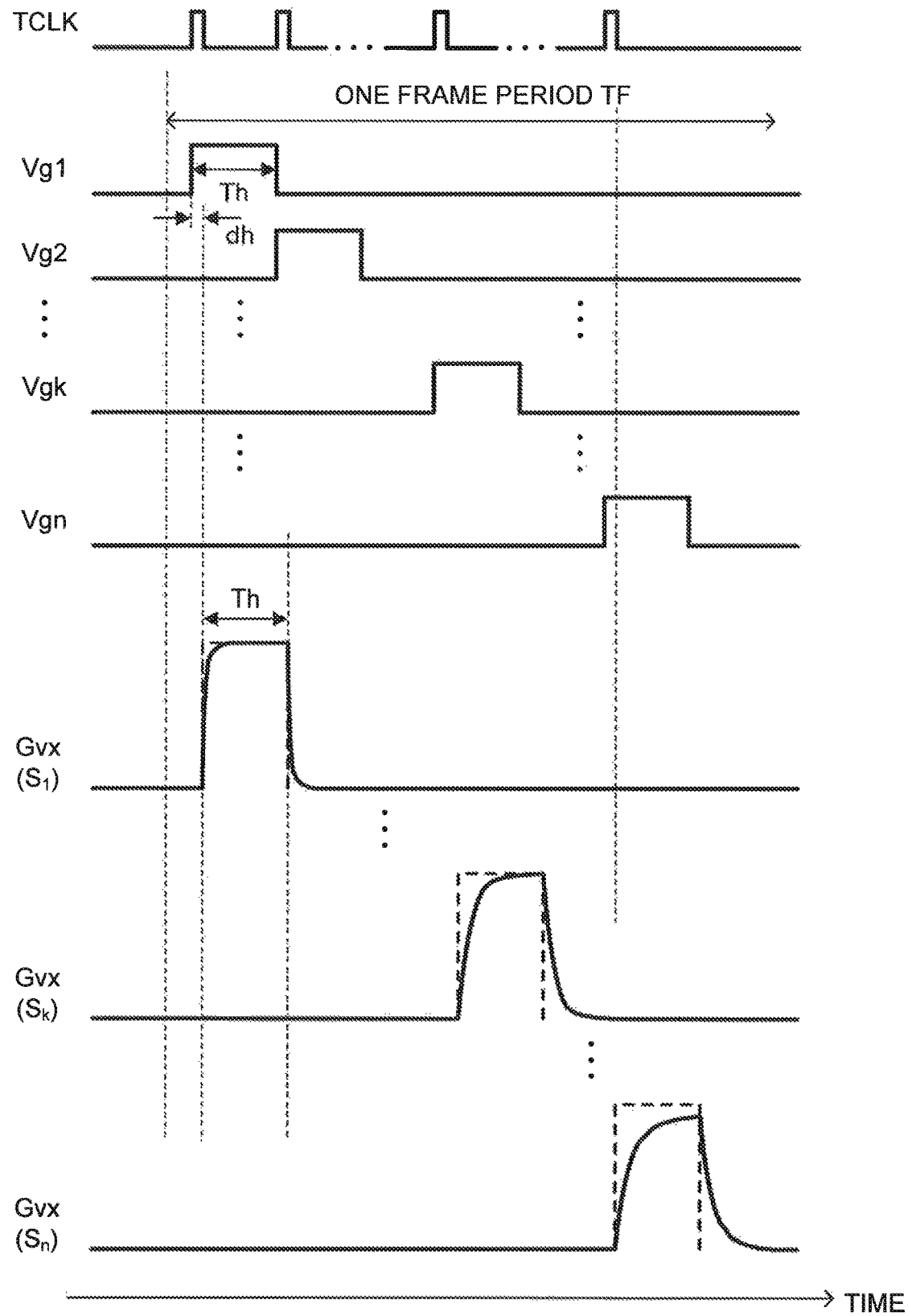
FIG. 5 is a timing chart showing signals in a display device according to a comparative example, different from the display device according to the present embodiment.

FIG. 5 is a timing chart showing respective signals in a display device as a comparative example. Unlike the display device 100 according to the present embodiment, this display device of the comparative example is a standard display device that operates on the basis of a clock signal CLK having a constant pulse width and a constant pulse interval within one frame period TF.

The gradation voltage signal Gvx selected by the scan signals Vg1 and Vg2 immediately after a start of one frame period TF serves as a gradation voltage signal on a side closer to the data driver (hereinafter, referred to as a data line near end). Since the effect of the impedance of the data line is small, the rising edges of the signal waveform of such a gradation voltage signal Gvx are not much rounded. Thus, the voltage levels of the supplied gradation voltage signal Gvx can be written to the pixel electrodes without a change. The gradation voltage signal Gvx selected by a scan signal Vgk in the middle of one frame period TF serves as a gradation voltage signal in the midsection of the data line. While the waveform (degree of rise in the signal level) is rounded due to the effect of the impedance of the data line, the voltage level of the gradation voltage signal Gvx supplied from the data driver is reached in the latter half of the selection period Th and this voltage level can be written to the pixel electrode.

By contrast, the gradation voltage signal Gvx selected by the scan signal Vgn before the end of the frame period TF serves as a gradation voltage signal on a side farther from the data driver (hereinafter, referred to as a data line far end). The rising edge of the signal waveform is much rounded due to the effect of the impedance of the data line. The supplied gradation voltage level fails to be reached within one data period, and a voltage level below that of the supplied gradation voltage signal Gvx is written to the pixel electrode. Consequently, insufficient writing to pixel electrodes occurs near the data line far end, causing luminance differences on the display panel.

Referring to FIG. 4 again, in the display device 100 according to the present embodiment, the selection period of the scan signal Vg1 and one data period (denoted by Th1) of the gradation voltage signal Gvx($S_1$) corresponding to the scan line at the data line near end are set to a period relatively shorter than one standard data period Th according to the comparative example of FIG. 5. The gradation voltage signal Gvx at the data line near end is not much affected by the impedance of the data line, and the rising edge of the signal waveform is not much rounded. The voltage level of the supplied gradation voltage signal Gvx can still be written to the pixel electrode without a change, even in one short data period Th1.

By contrast, the selection period of the scan signal Vgn and one data period (denoted by Thn) of the gradation voltage signal Gvx($S_n$) corresponding to the scan line at the data line far end are set to a period relatively longer than one standard data period Th according to the comparative example of FIG. 5. Since the gradation voltage signal Gvx($S_n$) selected by the scan signal Vgn is a gradation voltage signal at the data line far end, the waveform is much rounded due to the high effect of the impedance of the data line. However, since one data period Thn is increased, the voltage level of the gradation voltage signal Gvx supplied from the data driver 13 can be reached within the one data period Thn and the voltage level can be written to the pixel electrode.

As described above, in the display device 100 according to the present embodiment, the gate driver 14 supplies scan signals (Vg1, Vg2, . . . ) having shorter pulse widths to scan lines ($S_1$, $S_2$, . . . ) closer to the data driver 13. The gate driver 14 supplies scan signals (Vgn, Vgn−1, . . . ) having longer pulse widths to scan lines ($S_n$, $S_{n-1}$, . . . ) farther from the data driver 13. This increases the selection periods and the data periods of the pixel units on the side farther from the data driver 13. As a result, the write voltages to the pixel electrodes reach respective desired levels (i.e., voltage levels of the gradation voltage signals supplied from the data driver 13) even if the waveforms (degrees of rise in the signal levels) of the gradation voltage signals Gv1 to Gvm are rounded due to the effect of the impedance of the data lines.

Figure 6:
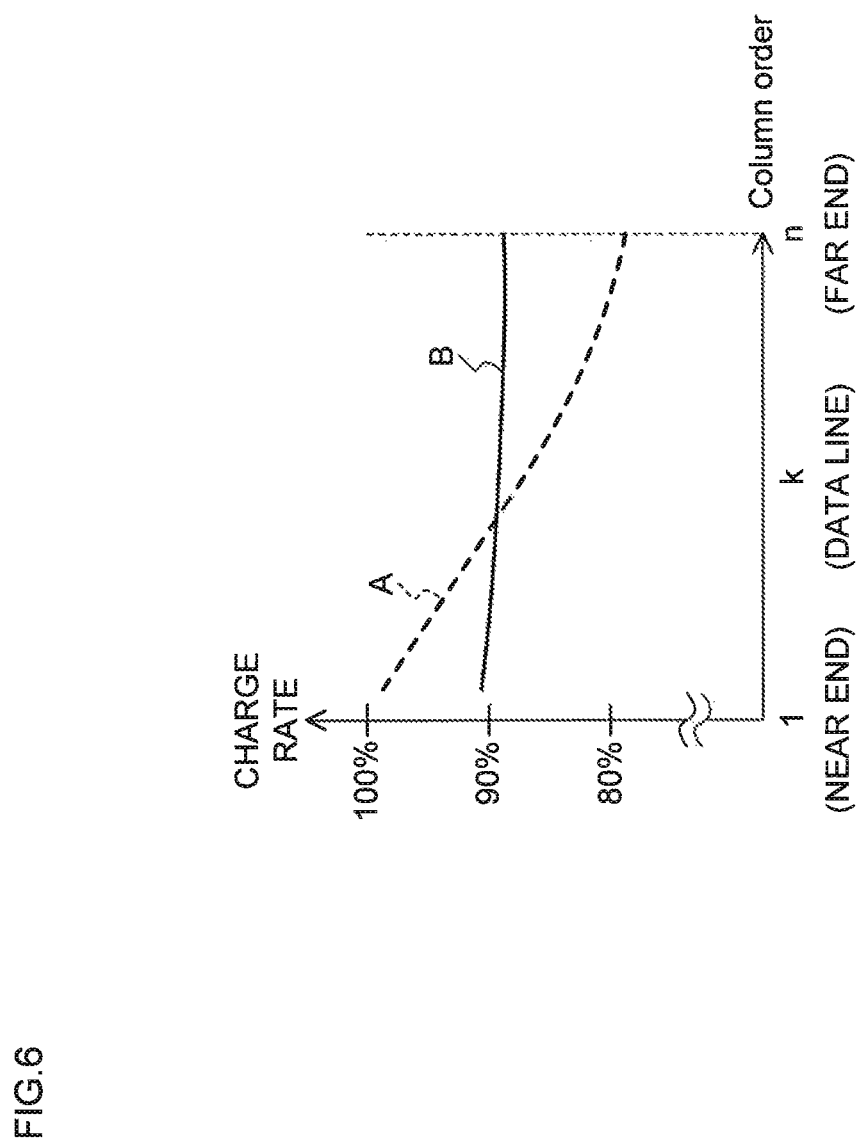
FIG. 6 is a chart showing a relationship between a position on a data line and the charge rate of a pixel unit within one data period when the gradation voltage signal is oscillating with a maximum amplitude.

FIG. 6 is a chart showing a relationship between a position on a data line and the charge rate of a pixel unit in one data period when the gradation voltage signal Gvx is oscillating with a maximum amplitude. The broken line (A) in FIG. 6 represents a case where the length of one data period of the gradation voltage signal Gvx is constant regardless of the distance from the data driver as in the comparative example (see FIG. 5). In such a case, the charge rates of pixel units on the data line far end decrease due to the rounding of the gradation voltage signal Gvx. The solid line (B) in FIG. 6 represents a case where the length of one data period of the gradation voltage signal Gvx is changed depending on the distance from the data driver as in the present embodiment (see FIG. 4). In such a case, the charge rates of the pixel units on the data line near end are decreased and the charge rates of the pixel units on the data line far end is increased, whereby differences in the charge rates of the pixel units between the data line near end and the data line far end can be reduced. This can improve luminance variations within the panel occurring from differences in the charge rates of the pixel units, and provide high image quality.

If the pulse widths of the scan signals corresponding to the scan lines on the data line near end are reduced to reduce the selection periods of the pixel switches as described above, the time for the data driver to read the pixel data corresponding to the pixels on the scan lines on the data line near end decreases as well. In a general data supply method for supplying pieces of display data to scan lines in order of the arrangement thereof, the interface between the display controller and the data driver would normally need to perform high speed transmission with an increase in power consumption.

On the contrary, in the display device 100 according to the present embodiment, the gate driver 14 supplies the scan signals Vg1 to Vgn to the scan lines closer to the data driver 13 and the scan lines farther from the data driver 13 in an alternate manner, in order from the outer sides of the scan lines $S_1$ to $S_n$ (peripheral portions of the display panel 11) to the inner side (center portion of the display panel 11). The display controller 12 supplies the data driver 13 with the video data signal VD in which the pieces of display data PD corresponding to the respective scan lines are arranged in order of the scan lines $S_1$, $S_n$, $S_2$, $S_{n-1}$, $S_3$, . . . in response to the order of supply of the scan lines Vg1 to Vgn. In this case, the scan lines closer to the data driver 13 and the scan lines farther from the data driver 13 are combined in pairs so that pieces of display data PD corresponding to two scan lines in each pair constitute display data PD for two horizontal scan lines for supply. The display data PD can thus be transmitted from the display controller 12 to the data driver 13 in equivalent transmission time, compared to the display device of the comparative example where scan signals having a constant pulse width are supplied. This eliminates the need for high speed transmission and can thus suppress power consumption.

As described above, according to the display device 100 of the present embodiment, a display with suppressed luminance variations ascribable to the impedances of the data lines can be effected while suppressing the power consumption.

Second Embodiment

Next, a display device according to a second embodiment will be described. The display device according to the present embodiment has the same configuration as that of the display device 100 according to the first embodiment shown in FIG. 1. The display device according to the present embodiment is different from the display device 100 according to the first embodiment in that it performs a precharge operation on the scan lines $S_1$ to $S_n$.

Like the first embodiment, the gate driver 14 of the present embodiment supplies the scan signals Vg1 to Vgn to the scan lines closer to the data driver 13 and the scan lines farther from the data driver 13 in an alternate manner. The pulse widths of the supplied scan signals are set to different pulse widths depending on the distance from the data driver 13 (specifically, shorter pulse widths for the scan lines closer to the data driver 13, and longer pulse widths for the scan lines farther from the data driver 13). The gate driver 14 of the present embodiment is further different from the gate driver of the first embodiment in that it precharges a scan line adjoining one to which a scan signal is supplied.

Figure 7A:
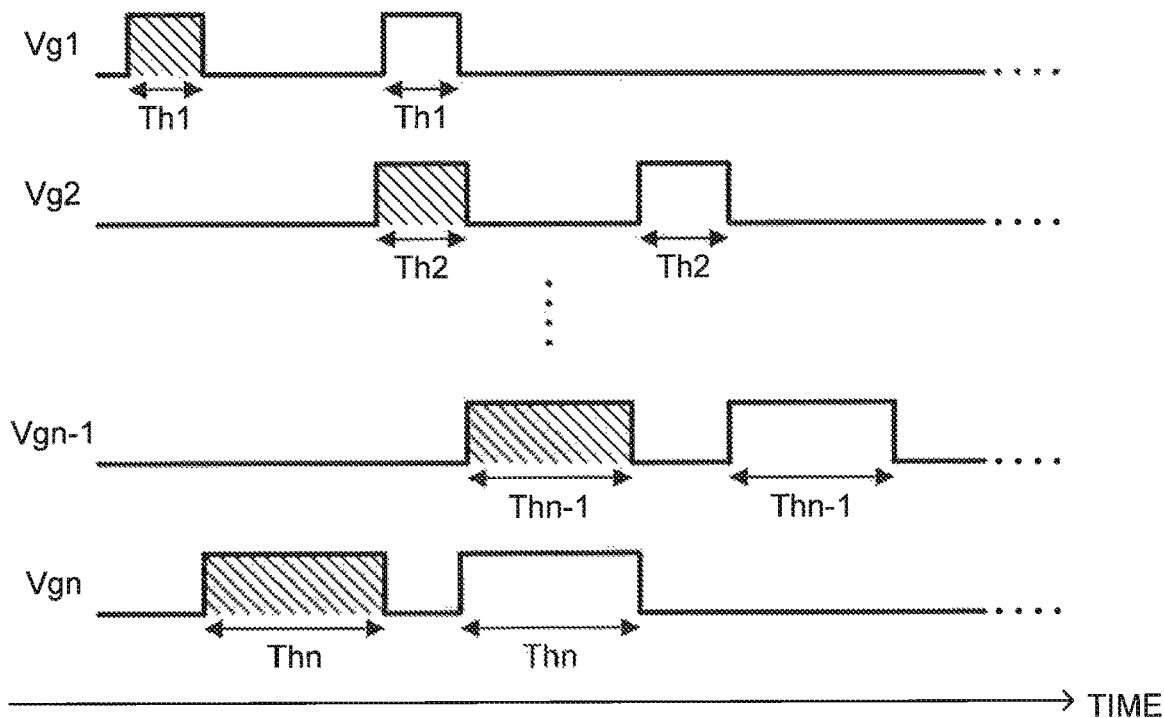
FIG. 7A is a timing chart showing the supply of scan signals and the precharging of scan lines according to a second embodiment.

FIG. 7A is a timing chart showing the supply of the scan signals and the precharging of the scan lines by the gate driver 14 according to the present embodiment.

The gate driver 14 precharges the scan line $S_2$ when supplying the scan signal Vg1 to the scan line $S_1$, and precharges the scan line $S_{n-1}$ when supplying the scan signal Vgn to the scan line $S_n$. The gate driver 14 then precharges the scan line $S_3$ when supplying the scan signal Vg2 to the scan line $S_2$, and precharges the scan line $S_{n-2}$ when supplying the scan signal Vgn−1 to the scan line $S_{n-1}$.

As described above, when the gate driver 14 according to the present embodiment supplies a scan signal to a scan line on the data line near end, the gate driver 14 precharges an adjoining scan line on the inner side (side toward the data line far end) of the scan line. When supplying a scan signal to a scan line on the data line far end, the gate driver 14 precharges an adjoining scan line on the inner side (side toward the data line near end) of the scan line. Each scan line is thus precharged not immediately before a scan signal is supplied thereto but a predetermined period before (for example, the scan line $S_1$ is precharged a period Thn before the supply of the scan signal Vg1).

Figure 7B:
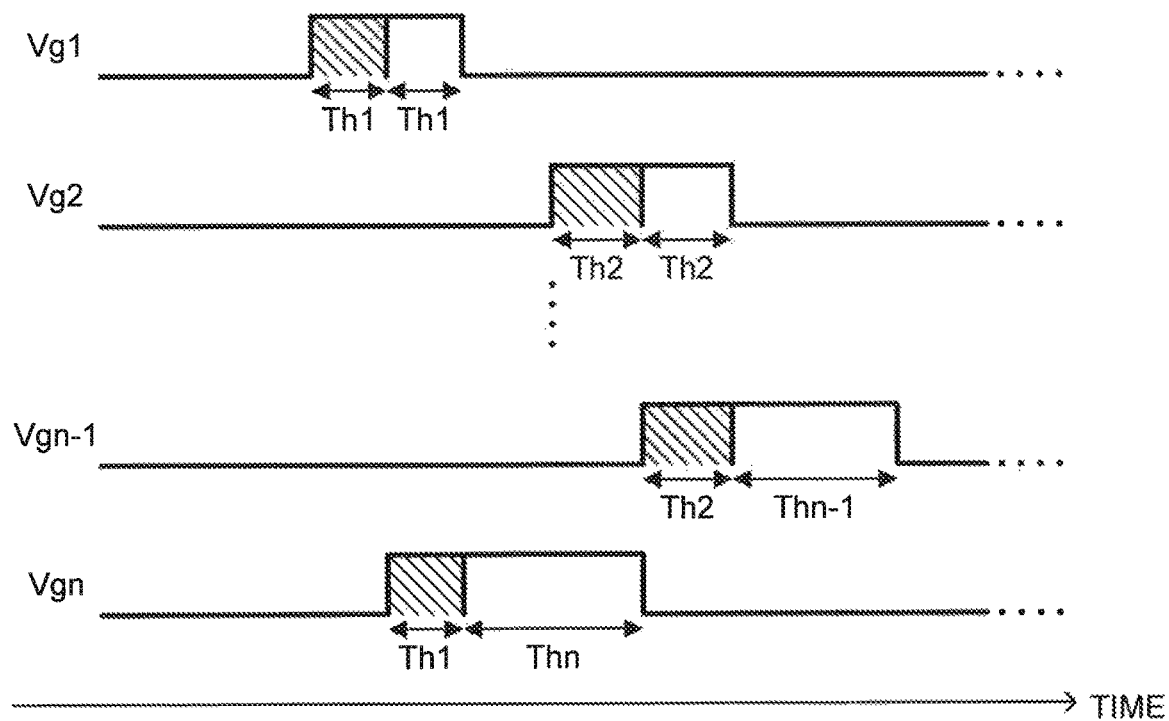
FIG. 7B is a timing chart showing the supply of scan signals and the precharging of scan lines according to a comparative example.

FIG. 7B is a timing chart according to a comparative example in which, unlike the present embodiment, the scan lines $S_1$ to $S_n$ are precharged immediately before the supply of the scan signals Vg1 to Vgn. Suppose that, like the first embodiment, the scan signals Vg1 to Vgn having different pulse widths depending on the distance from the data driver 13 are alternately supplied in order from the outer sides to the inner side of the scan lines $S_1$ to $S_n$. If the precharging is attempted immediately before the supply of the scan signals, scan lines farther from the data driver 13 can only be precharged for a short period of time. If the scan line to be supplied with a scan signal and the scan line to be precharged are wide apart, an artifact like an afterimage can appear in the image display.

By contrast, according to the precharge operation of the present embodiment, the scan line to be precharged adjoins the scan line to be supplied with a scan signal. This can suppress the effect of an afterimage and the like caused by the precharging on the image display. In addition, even scan lines farther from the data driver 13 can be sufficiently precharged.

The present invention is not limited to the foregoing embodiments. For example, in the foregoing embodiments, the display device 100 is described to be a liquid crystal display device. However, the display device 100 may be an organic electroluminescent (EL) display device instead. If the display device 100 is an organic EL display device, the pixel units $P_{11}$ to $P_{nm}$ each include an organic EL element and a thin-film transistor that controls a current to pass through the organic EL element. The thin-film transistors control the currents to pass through the organic EL elements on the basis of the gradation voltage signals Gv1 to Gvm supplied to the pixel units $P_{11}$ to $P_{nm}$. The emission luminance of the organic EL elements changes with the currents, whereby a display is effected. The application of the present invention to an organic EL display device can also provide a display with suppressed luminance variations.

The foregoing first embodiment is described by using an example where the gate driver 14, when alternately supplying the scan signals Vg1 to Vgn to the scan lines closer to the data driver 13 and farther from the data driver 13, supplies the scan signals Vg1 to Vgn in order of the scan lines $S_1$, $S_n$, $S_2$, $S_{n-1}$, $S_3$, . . . , i.e., from the outer sides to the inner side of the scan lines $S_1$ to $S_n$. However, the scan signals may be alternately supplied to the scan lines closer to the data driver 13 and farther from the data driver 13 in reverse order, i.e., from the inner side to the outer sides of the scan lines $S_1$ to $S_n$. In other words, the gate driver 14 can alternately supply the scan signals Vg1 to Vgn to the scan lines on the data line near end and the scan lines on the data line far end in a predetermined order. The display controller 12 can supply display data PD to the data driver 13 in a corresponding predetermined order in units of display data pairs each including a kth piece of display data and an (n+1−k)th piece of display data (k is an integer of 1 to (½)n).

In the foregoing embodiments, the latch circuit 131 is described to include switches composed of transmission gates. However, this is not restrictive. Other switches such as an edge trigger switch may be included.

The data driver 13 and the gate driver 14 each may be configured as a single driver LSI. The data driver 13 and the gate driver 14 may include a plurality of separate driver LSIs each.

The display panel 11 may be a color full high definition (FHD) panel, a 4K panel, or an 8K panel.

What is claimed is:

1. A display device comprising:
a display panel including a plurality of data lines and a plurality of scan lines intersecting with each other, and pixel switches and pixel units provided at respective intersections of said plurality of data lines and said plurality of scan lines;
a gate driver configured to supply scan signals to said plurality of scan lines, thereby to cause said pixel switches to be on in a period corresponding to pulse widths of said scan signals;
a data driver configured to receive a video data signal including a plurality of display data pieces respectively corresponding to gradation voltages supplied to said pixel units for each row provided along respective scan lines, and supply gradation voltage signals corresponding to said video data signal to said plurality of data lines; and
a display controller configured to supply said video data signal to said data driver, wherein
said gate driver supplies said scan signals to said plurality of scan lines selectively in an alternating manner between a first set of scan lines and a second set of scan lines, the first set of scan lines being closer to said data driver than the second set of scan lines, said scan signals having different pulse widths depending on distance from said data driver to said respective scan lines,
said plurality of scan lines are arranged in a fixed order from a vicinity of said data driver,
said display controller supplies said plurality of display data pieces to said data driver in units of display data pairs consecutively, each of the data pairs including a kth piece of display data corresponding to a kth scan line of the first set of scan lines and an (n+1−k)th piece of display data corresponding to an (n+1−k)th scan line of the second set of scan lines, wherein n is a total number of scan lines, and k is an integer of 1 to (½)n, and
said data driver supplies said gradation voltage signals to said plurality of data lines on a basis of supply of said display data pairs from said display controller.

2. The display device according to claim 1, wherein:
said display controller supplies said plurality of display data pieces to said data driver in said units of said display data pairs in an order which is such that k increases in value from k=1 to k=(½)n; and
said gate driver supplies said scan signals in an order from a scan line located in an outer peripheral portion of said display panel to a scan line located in a center portion of said display panel among said plurality of scan lines.

3. The display device according to claim 1, wherein:
said display controller supplies a modulation clock signal and an inverted clock signal to said gate driver, an interval between clock pulses of the modulation clock signal changing to decrease stepwise within one frame period in which said video data signal having as much as one frame is supplied, said inverted clock signal being obtained by inverting said modulation clock signal; and
said gate driver generates said scan signals having different pulse widths depending on the distance to said respective scan lines on a basis of the modulation clock signal and said inverted clock signal.

4. The display device according to claim 1, wherein:
said data driver includes a latch circuit configured to take in said display data supplied from said display controller; and
said latch circuit includes
a first latch unit configured to take in and output said display data pieces supplied from said display controller,
a second latch unit including a near end-side latch unit configured to take in, from among said display data pieces output by said first latch unit, ones of said display data pieces corresponding to a scan line of the first set of scan lines, and a far end-side latch unit configured to take in ones of said display data pieces corresponding to a scan line of the second set of scan lines, said second latch unit being configured to alternatingly output said ones of the display data pieces taken in by said near end-side latch unit and said ones of the display data pieces taken in by said far end-side latch unit, and
a third latch unit configured to take in and output said ones of the display data pieces output by said second latch unit.

5. The display device according to claim 1, wherein said gate driver supplies said scan signals to each of said plurality of scan lines and precharges an adjoining scan line of each of said plurality of scan lines.

6. A display controller to be connected to a display device including a gate driver and a data driver, and control said gate driver and said data driver, wherein
said display controller is configured to supply a video data signal having as much as one frame including first to nth pieces of display data to said data driver in units of display data pairs each including a kth piece of display data which corresponds to a gradation voltage supplied to a kth scan line among scan lines lined up from 1 to n from a closest to said data driver, and an (n+1−k)th piece of display data which corresponds to a gradation voltage supplied to an (n+1−k)th scan line among the scan lines lined up from 1 to n from the closest to said data driver, wherein n is a total number of scan lines and k is an integer of 1 to ($\frac{1}{2}$)n.

7. A gate driver to be connected to a display panel including a plurality of data lines and a plurality of scan lines intersecting with each other, and pixel switches and pixel units arranged in a matrix and provided at respective intersections of said plurality of data lines and said plurality of scan lines, said gate driver being configured to supply scan signals for controlling said pixel switches to be on in a period corresponding to pulse widths of said scan signals to said plurality of scan lines, wherein
said plurality of scan lines are arranged in a fixed order from a vicinity of said data driver, and
the gate driver is configured to supply said scan signals to said plurality of scan lines selectively in an alternating manner between a first set of scan lines and a second set of scan lines, the first set of scan lines being closer to said display driver than the second set of scan lines, in units of scan line pairs each including a kth scan line of the first set of scan lines and an (n+1−k)th scan line of the second set of scan lines, wherein n is a total number of scan lines and k is an integer of 1 to ($\frac{1}{2}$)n, said scan signals having different pulse widths depending on distance from said data driver to each of the plurality of scan lines.

8. A data driver to be connected to a display panel including a plurality of data lines and a plurality of scan lines intersecting with each other, and pixel switches and pixel units arranged in a matrix and provided at respective intersections of said plurality of data lines and said plurality of scan lines, said data driver being configured to supply gradation voltage signals corresponding to a video data signal to said plurality of data lines, wherein
said plurality of scan lines are arranged in a fixed order from a vicinity of said data driver, and
said data driver is configured to receive input of a video data signal including a plurality of display data pieces respectively corresponding to gradation voltages supplied to said pixel units for each row provided along respective scan lines, and supply the gradation voltage signals corresponding to said plurality of display data pieces to said plurality of data lines in units of display data pairs each including a kth piece of display data and an (n+1−k)th piece of display data, wherein n is a total number of scan lines and k is an integer of 1 to ($\frac{1}{2}$)n.

* * * * *